Aug. 18, 1964     J. JONASSEN     3,144,729

AUTOMATIC RELEASING FISHING FLOAT

Filed Dec. 27, 1962

INVENTOR.
JONAS JONASSEN.
BY
ATTORNEY.

3,144,729
AUTOMATIC RELEASING FISHING FLOAT
Jonas Jonassen, 418 32nd Ave. E., Bradenton, Fla.
Filed Dec. 27, 1962, Ser. No. 247,619
3 Claims. (Cl. 43—43.11)

This invention pertains to improvements in fishing gear and is particularly directed to an improved automatic releasing fishing float.

One of the objects of this invention is to provide a fishing float which automatically releases a predetermined length of fish line with the hook and sinker on its outer end when the cast float hits the water.

This application is related to my copending application Serial No. 187,819, filed April 16, 1962.

Another object is to provide an automatic releasing fishing float of simple construction and easy and foolproof to operate.

Still another object is a fishing float having a line spool upon which any desired length of drop line may be wound together with a float operated latch adapted to automatically release the drop line when the cast float strikes the water.

Further features and advantages of this invention will appear from a detailed description of the drawings in which.

Figure 1:
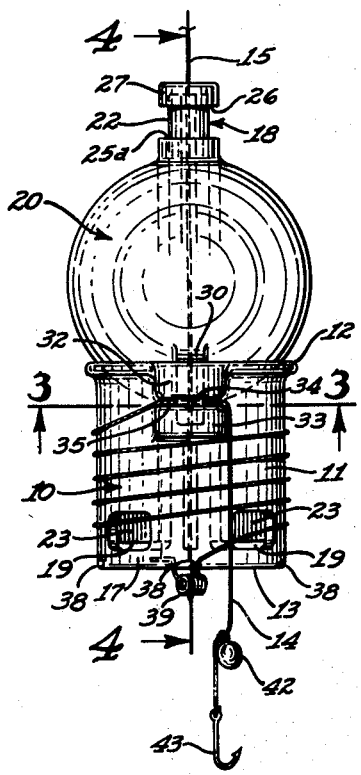
FIG. 1 is a side elevation of an automatic releasing fishing float incorporating the features of this invention.

As an example of one embodiment of this invention, there is shown an automatic releasing fishing float comprising a drop line spool 10 having a diameter portion 11, the top flange portion 12 and the bottom edge 13 between which is wound the drop line portion 14 of the fishing line 15. The inside of the spool 10 has a bore 16 across the lower end of which is formed the bottom 17. Centrally located and upstanding from the bottom is the stem 18. Suitable openings 19 are formed in the drop line spool 10 immediately above the bottom 17 to delay water flow when releasing the spherical float member 20.

The spherical float member 20 has a centrally located bore 21 which is axially slidable on the outside diameter 22 of the stem 18. Formed integral with and downwardly extending from the spherical float member 20 are a plurality of spool guides 23 having their peripheral outer surfaces 24 slidingly engaging in the bore 16 of the drop line spool 10. The spherical float member 20 is stopped in its upward position of drop cord release when the upper surface 25a of the integral slide tube 25 of the spherical float member 20 engages the under surface 26 of the stop collar 27 fixed to the upper outer end 28 of the stem 18. A suitable guide hole 29 is provided in the collar 27 for the fishing line 15.

Figure 4:
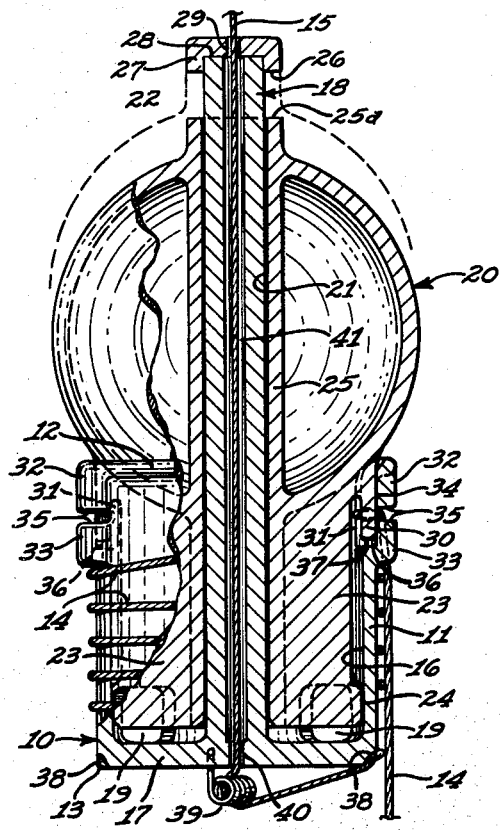
FIG. 4 is an enlarged fragmentary sectional view on the line 4—4 of FIG. 1.
Figure 2:
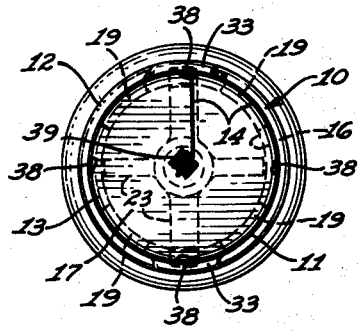
FIG. 2 is a bottom view of the fishing float shown in FIG. 1.
Figure 3:
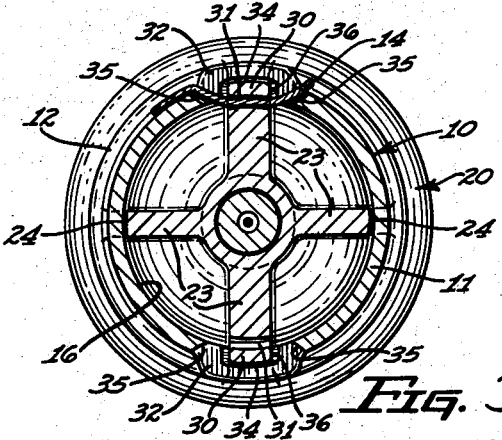
FIG. 3 is an enlarged sectional view on the line 3—3 of FIG. 1.

Depending downwardly from diametrically opposite sides of the spherical float 20 are the integral locking lugs 30 spaced radially outwardly from a pair of spool guides 23 so as to form the line receiving slots 31. Formed integral with the drop line spool 10 are the upper and lower bridge pieces 32 and 33 which extend across the outside face 34 of the locking lugs 30 so as to form a line slot 35 extending across and to each side of said locking lugs 30. Recesses 36 are formed in the bore 16 of the drop line spool which are adapted to slidingly receive the locking lugs 30. The lower ends 37 of the locking lugs 30 are adapted to move above the slots 35 when the float 20 is moved to upper position relative to spool 20, as shown in dotted lines FIG. 4, the ends 37 moving down below the slot 35 when the float 20 is in lowered position relative to said spool 10.

A plurality of line notches 38 are formed in the bottom edge 13 of the spool 10 to hold the leader or drop line 14 from slipping while winding the line 14 on the diameter portion of the spool 10. A spring lock coil 39 is fixed to the bottom 17 of the spool 10 and directly below the lower opening 40 of the line bore 41 in the stem 18 so as to secure the drop line 14 after the desired length has been chosen.

To prepare the above described float for casting, the desired amount of the drop line having the sinker 42 and hook 43 attached to its outer end is drawn through the line bore 41, the lower opening 40, and attached to the spring lock coil. With the float 20 in raised position, the drop line 14 is passed through a line notch 38 and then wound upwardly on the diameter portion 11 of the spool 10 with the last turn being passed through one or more of the locking slots 35. The float is then moved to lowered position, as shown in FIG. 1, so as to lock the line in the slot 31 and between the bridges 32 and 33 ready for casting.

When the float hits the water, the sinker and hook cause it to float upright so that water enters the openings 19 allowing the spool 10 to sink relative to the float 20 thereby causing the locking lugs 30 to move relatively upwardly allowing the drop line 14 to slip from the slots 35 and drop the sinker and hook to desired depth below the water surface.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. An automatic releasing drop line fishing float comprising in combination:
   (A) a drop line spool having,
   (B) a diameter portion,
   (C) a top flange portion,
   (D) a bottom edge,
   (E) a bottom,
   (F) and a bore surface inside thereof,
   (G) a centrally located upstanding stem formed integral with said bottom,
   (H) there being openings formed in said spool immediately above and adjacent to said bottom,
   (I) a spherical float member having a centrally located bore axially slidable on the outside diameter of said stem,
   (J) a plurality of downwardly extending spool guides formed integral with said float member having
   (K) peripheral outer surfaces slidingly engaging in the bore of said drop line spool,
   (L) a stop on the upper end of said stem adapted to engage said spherical float member to arrest its upward motion on said stem,
   (M) there being a fishing line bore extending axially through said stem and the bottom of said drop line spool,
   (N) downwardly depending integral locking lugs at diametrically opposite sides of said spherical float spaced radially outwardly from a pair of said spool guides so as to form line receiving slots,
   (O) upper and lower bridge pieces formed integral with said drop line spool extending across the outside face of said locking lugs so as to form a line slot extending across and to each side of said locking lugs, (P) and there being recesses formed in the bore of said drop line spool which are adapted to slidably receive said locking lugs so that the lower ends of said locking lugs move to a position above said line slots when the float is moved to upper position relative to said spool and said lower ends moving down below said line slots when the float is in lowered position relative to said spool.

2. An automatic releasing drop line fishing float comprising in combination:
  (A) a drop line spool having,
  (B) a diameter portion,
  (C) a top flange portion,
  (D) a bottom edge,
  (E) a bottom,
  (F) and a bore surface inside thereof,
  (G) a centrally located upstanding stem formed integral with said bottom,
  (H) there being openings formed in said spool immediately above and adjacent to said bottom,
  (I) a spherical float member having a centrally located bore axially slidable on the outside diameter of said stem,
  (J) a plurality of downwardly extending spool guides formed integral with said float member having
  (K) peripheral outer surfaces slidingly engaging in the bore of said drop line spool,
  (L) a stop on the upper end of said stem adapted to engage said spherical float member to arrest its upward motion on said stem,
  (M) there being a fishing line bore extending axially through said stem and the bottom of said drop line spool,
  (N) downwardly depending integral locking lugs at diametrically opposite sides of said spherical float spaced radially outwardly from a pair of said spool guides so as to form line receiving slots,
  (O) upper and lower bridge pieces formed integral with said drop line spool extending across the outside face of said locking lugs so as to form a line slot extending across and to each side of said locking lugs,
  (P) there being recesses formed in the bore of said drop line spool which are adapted to slidably receive said locking lugs so that the lower ends of said locking lugs move to a position above said line slots when the float is moved to upper position relative to said spool and said lower ends moving down below said line slots when the float is in lowered position relative to said spool,
  (Q) and there being a plurality of line notches formed in the bottom edge of said spool to hold the drop line from slipping while winding the line on the diameter portion of the spool.

3. An automatic releasing drop line fishing float comprising in combination:
  (A) a drop line spool having,
  (B) a diameter portion,
  (C) a top flange portion,
  (D) a bottom edge,
  (E) a bottom,
  (F) and a bore surface inside thereof,
  (G) a centrally located upstanding stem formed integral with said bottom,
  (H) there being openings formed in said spool immediately above and adjacent to said bottom,
  (I) a spherical float member having a centrally located bore axially slidable on the outside diameter of said stem,
  (J) a plurality of downwardly extending spool guides formed integral with said float member having
  (K) peripheral outer surfaces slidingly engaging in the bore of said drop line spool,
  (L) a stop on the upper end of said stem adapted to engage said spherical float member to arrest its upward motion on said stem,
  (M) there being a fishing line bore extending axially through said stem and the bottom of said drop line spool,
  (N) downwardly depending integral locking lugs at diametrically opposite sides of said spherical float spaced radially outwardly from a pair of said spool guides so as to form line receiving slots,
  (O) upper and lower bridge pieces formed integral with said drop line spool extending across the outside face of said locking lugs so as to form a line slot extending across and to each side of said locking lugs,
  (P) there being recesses formed in the bore of said drop line spool which are adapted to slidably receive said locking lugs so that the lower ends of said locking lugs move to a position above said line slots when the float is moved to upper position relative to said spool and said lower ends moving down below said line slots when the float is in lowered position relative to said spool,
  (Q) there being a plurality of line notches formed in the bottom edge of said spool to hold the drop line from slipping while winding the line on the diameter portion of the spool,
  (R) and a spring lock coil fixed to the bottom of said spool located directly below the lower opening of said line bore in the bottom and stem thereof adapted to secure said drop line after the desired line length has been chosen.

References Cited in the file of this patent
UNITED STATES PATENTS

| | | |
|---|---|---|
| 2,720,720 | Landrum | Oct. 18, 1955 |
| 2,963,813 | Graham | Dec. 13, 1960 |
| 3,063,188 | Turner | Nov. 13, 1962 |

FOREIGN PATENTS

| | | |
|---|---|---|
| 611,631 | Canada | Jan. 3, 1961 |
| 98,285 | Norway | July 10, 1961 |